(12) United States Patent
Nakata et al.

(10) Patent No.: US 6,498,900 B1
(45) Date of Patent: Dec. 24, 2002

(54) AUTOMATIC FOCUSING APPARATUS

(75) Inventors: Masahiro Nakata, Saitama (JP); Satoru Horita, Tochigi (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 5 days.

(21) Appl. No.: 09/583,027

(22) Filed: May 30, 2000

(30) Foreign Application Priority Data

May 31, 1999 (JP) .......................................... 11-151589

(51) Int. Cl.[7] .............................................. G03B 13/36
(52) U.S. Cl. ..................................................... 396/108
(58) Field of Search ................................ 396/106, 108; 250/201.4; 356/3.01

(56) References Cited

U.S. PATENT DOCUMENTS 4,723,073 A * 2/1988 Amikura et al. ......... 250/201.4
4,969,006 A   11/1990 Ishibashi et al. ............... 396/96
5,448,331 A    9/1995 Hamada et al. ............. 396/106

FOREIGN PATENT DOCUMENTS

| JP | 62215248 | 9/1987 | ............ G03B/3/00 |
| JP | 5-34577 | 2/1993 | ............ G02B/7/28 |
| JP | 2000111791 | 4/2000 | ........... G03B/13/36 |

* cited by examiner

*Primary Examiner*—W. B. Perkey
(74) *Attorney, Agent, or Firm*—Greenblum & Bernstein, P.L.C.

(57) ABSTRACT

An automatic focusing apparatus in which the quantity of auxiliary light can be precisely controlled regardless of conditions of an object to be taken is disclosed. The apparatus includes a passive AF sensor unit, a flash device and a main CPU which controls the flash device as an auxiliary light source for the focus detection, so that the flash device intermittently emits flashes of light. The main CPU increases emission time and emission time interval stepwise from the minimum value when the flash device intermittently emits flashes of light as the auxiliary light source upon detection of the focused state.

11 Claims, 7 Drawing Sheets

AUTOMATIC FOCUSING APPARATUS

BACKGROUND OF THE INVENTION

1. Field of the Invention

The present invention relates to an automatic focusing apparatus for a camera in which a flash light is used as an auxiliary light source, for example, when the brightness or contrast of an object is low.

2. Description of the Related Art

In a conventional passive AF (autofocusing) camera, for example, if the brightness or contrast of an object to be taken is low, an auxiliary light source incorporated in the camera body projects a contrast pattern as auxiliary light onto the object, so that a contrast is produced on an object image received by an AF sensor to detect the focused state based on the object image. However, the provision of the focusing auxiliary light source in addition to a photographing flash lamp increases the manufacturing cost. To solve this, it is known to intermittently emit flashes of light by the flash lamp to thereby obtain auxiliary light for the automatic focusing operation, as disclosed in the U.S. Pat. No. 5,448,331.

However, in the emission control system in which flashes of light are intermittently emitted, the integral value of the AF sensor exceeds a processible range by one emission if the object distance is small or the object's reflectance is high, so that no focusing operation can be carried out. Moreover, if the object distance is large or the object's reflectance is low, the number of the emissions of auxiliary light is increased, thus leading to an increase in the time necessary to complete an integration process of the AF sensor. Consequently, the significant purpose the auxiliary light, i.e., a quick focus detection and a fast automatic focusing cannot be achieved.

Furthermore, the charge voltage of a voltage doubler condenser to apply a doubled voltage to a xenon tube of the flash lamp is reduced due to the emission of the flash light and is thereafter increased by charging the condenser for a subsequent emission of the flash light. However, if the number of emissions is increased, the power consumption of the flash device is increased, and hence, the time for the subsequent emission of the flash light comes before the charge voltage of the voltage doubler condenser is recovered to a voltage large enough to emit the flash light, thus resulting in a failure of emission. To prevent this, the charge voltage of the flash device at the commencement of the intermittent flashes of light must be set high.

SUMMARY OF THE INVENTION

It is an object of the present invention to eliminate the drawbacks of the prior art mentioned above, by providing an automatic focusing apparatus in which the quantity of auxiliary light to be emitted can be precisely controlled, regardless of the conditions of the object to be taken.

To achieve the above mentioned object, an automatic focusing apparatus is provided which includes a focus detector for receiving object light and detecting a focused state of an object, a light emitter for emitting a flash of light toward to the object, and an emission controller for causing the light emitter to intermittently emit flashes of light as an auxiliary light source for detecting the focused state when focus detection cannot be carried out by the focus detector. The emission controller varies stepwise at least one of an emission time and an emission time interval at every predetermined number of emissions, when the light emitter intermittently emits flashes of light as the auxiliary light source.

In an embodiment, the emission controller varies stepwise both the emission time and the emission time interval at every predetermined number of emissions when the light emitter intermittently emits flashes of light as the auxiliary light source.

In an embodiment, the emission controller increases the emission time and/or the emission time interval, as the number of emissions increases.

In an embodiment, the emission time and/or the emission time interval at the commencement of the emission is the controllable shortest time.

Preferably, the emission controller causes the light emitter to intermittently emit flashes of light when the focus detector cannot detect the focused state without emitting auxiliary light.

Preferably, the automatic focusing apparatus is applied to a camera having a controller which moves a focusing lens of a photographing lens in accordance with the detection result of the focus detector, wherein when the focus detector cannot detect the focused state while intermittently emitting flashes of light by the light emitter, the controller moves the focusing lens to a predetermined position and then controls the emission controller so that the focus detector detects the focused state while the emission controller causes the light emitter to intermittently emit flashes of light.

Preferably, the emission controller sets a preset maximum number of the emissions.

Preferably, the focus detector includes an image pickup device which receives object light, converts the object light information into electric signals, and integrates the electric signals as electric charges; and wherein upon intermittent emission of the light emitter, the emission controller stops the intermittent emission of the light emitter when the integral value of the image pickup device reaches a predetermined value before the number of the emissions reaches the preset maximum number.

In an embodiment, the emission time and the emission time interval is defined by a predetermined calculation based on a predetermined reference emission time, a predetermined reference emission time interval, and the number of emissions until the previous emission of the light emitter.

Preferably, the emission time and the emission time interval is defined by the following expressions (1) and (2):

$$\text{Emission time} = \text{reference emission time} + \text{correction time} \times \text{the emission number} \div \text{correction number}; \quad (1)$$

and $$\text{Emission time interval} = \text{reference emission interval} + \text{correction interval} \times \text{the emission number} \div \text{correction number}; \quad (2)$$

wherein the correction time, the correction interval and the correction number are predetermined values.

With the above described arrangements, the quantity of auxiliary light to be emitted by the light emitter can be precisely controlled, regardless of photographic conditions, etc., of the object to be taken.

The present disclosure relates to subject matter contained in Japanese Patent Application No. 11-151589 (filed on May 31, 1999) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
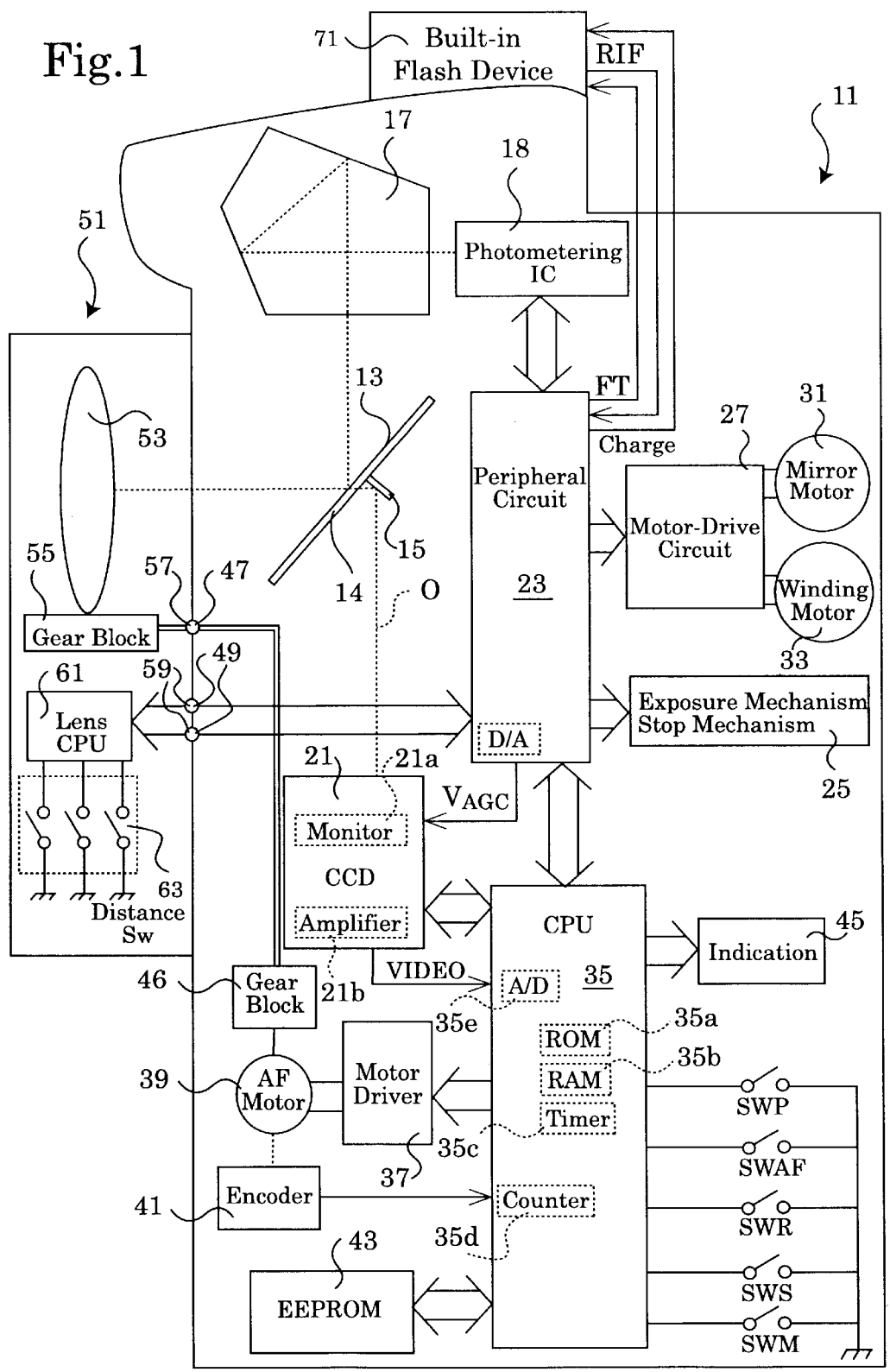
FIG. 1 is a block diagram of an automatic focusing single lens reflex camera according to an embodiment of the present invention.

FIG. 1 shows a block diagram of essential components of an autofocusing (AF) single lens reflex camera to which the present invention is applied. The AF single lens reflex camera includes a camera body 11 and a photographing lens 51, which can be used for an AF single lens reflex camera and is detachably attached to the camera body 11. The camera body 11 is provided with a focus detecting device (focus detector) and a built-in flash device 71.

A substantial part of object light (object-carrying object image light) incident on the photographing lens 51, which enters the camera body 11 through the photographing lens 51, is reflected by a main mirror 13 toward a pentagonal prism 17 which constitutes a finder optical system, and is reflected by the pentagonal prism 17 and is emitted from an eyepiece. A portion of the object light emitted from the pentagonal prism 17 is made incident upon a light receiving element of a photometering IC 18. A portion of the object light incident upon a half mirror portion 14 of the main mirror 13 is transmitted therethrough, and is reflected downward by a sub-mirror 15 and reaches an AF sensor unit (focus detector) 21.

The photometering IC 18 generates an electric signal corresponding to the quantity of light received thereby and supplies the electric signal as a brightness signal to a main CPU 35 through a peripheral circuit controller 23. The main CPU 35 performs a predetermined exposure calculation based on the brightness signal and film speed data to determine appropriate shutter speed and aperture value for exposure. An exposure mechanism and a stop mechanism (diaphragm mechanism) 25 are driven based on the shutter speed and the aperture value to expose the film. The peripheral circuit controller 23, upon photographing, drives a mirror motor 31 through a motor drive circuit 27 to carry out the upward/downward movement (up/down operation) of the main mirror 13 and, upon completion of the exposure, drives a film winding motor 33 to wind the film by one frame.

The AF sensor unit 21 is a phase difference type distance measuring sensor which includes a beam splitter which splits the object light and defines object images in a plurality of focus detection areas within a picture plane (not shown) into two bundles of object light; CCD line sensors which receive the split object light bundles, convert the light into an electric signal (electric charges) and integrate the electric charges; and a monitor sensor 21a which checks the integral value of each CCD line sensor. The electric charges obtained by the integration process at each CCD sensor are successively converted to a voltage for each pixel, which is amplified by an amplifier 21b and is output as a video signal for each pixel to the main CPU 35. The main CPU 35 completes the integration process of the CCD line sensors when the integral value of the monitor sensor 21a reaches a predetermined value.

The main CPU 35 calculates the amount of defocus, based on the video signals corresponding to the focus detection areas, supplied from the AF sensor unit 21. Thereafter, the direction of rotation and the number of revolutions of the AF motor 39 (the number of pulses output from the encoder 41) are determined based on the defocus amount. Based on the direction of rotation and the number of pulses thus obtained, the main CPU 35 drives the AF motor 39 via the AF motor driver 37. The main CPU 35 counts the number of pulses generated from the encoder 41 in association with the rotation of the AF motor 39 and stops the AF motor 39 when the counted number reaches the number of pulses.

The AF motor 39 transmits the rotation to the photographing lens 51 via a joint 47 provided on the body mount of the camera body 11 which is connected to a joint 57 provided on the lens mount of the photographing lens 51. Consequently, a focus control lens 53 is moved forward or backward via a gear block 55.

The main CPU 35 is provided therein with a ROM 35a which stores a control program, etc., a RAM 35b which temporarily stores calculation data or control data, a counting reference timer 35c, a hardware counter 35d, and an A/D converter 35e which converts the video signal input thereto from the AF sensor unit into a digital signal. As an external memory, an EEPROM 43 is connected to the main CPU 35. The EEPROM 43 stores therein inherent constants of the camera body 11, etc.

The camera body 11 is provided with a flash device 71 incorporated therein, which can be controlled by the main CPU 35 through the peripheral circuit controller 23. The built-in flash device 71 is provided above the pentagonal prism 17 and is provided with a xenon tube (light emitter) 73 (see FIG. 2) which is moved between a pop-up position and a retracted position, and vice versa. The built-in flash device 71 is made of a flash tube which is commonly used as an auxiliary light source for photographing and which can be used also as an auxiliary light source for detection of a focused state if the brightness or contrast of the object is too low to detect the focused state. The built-in flash device 71 emits flashes of light in response to an FT signal (trigger signal) input thereto from the main CPU 35 through the peripheral circuit controller 23 when the flash 71 is charged in response to a charge signal (charge commencement signal). The built-in flash device 71 detects the charge voltage and outputs an RIF signal (charge voltage detection signal) to the main CPU 35 through the peripheral circuit controller 23.

Connected to the main CPU 35 are a pop-up detection switch SWP which detects the pop-up position of the built-in flash device 71, a photometering switch SWS which is turned ON by a half-depression of a release button (not shown), a release switch SWR which is turned ON by a full depression of the release button, an autofocusing switch SWAF which is adapted to switch an autofocus control and a manual focus control, and a main switch SWM which is adapted to turn ON/OFF the power source for the peripheral circuit controller 23, etc. The main CPU 35 indicates the set AF mode, exposure mode or photographing mode, etc., the shutter speed or the aperture value, etc., in an indicator 45. The indicator 45 usually includes indicators provided on the outer surface of the camera body 11 and in the field of view of the finder.

The main CPU 35 functions not only as a control device (controller) for generally controlling the camera body 11 and the photographing lens 51, but also as an integration control device (integration controller) for controlling the integration process at the AF sensor unit 21 together with the peripheral circuit controller 23, etc. The main CPU 35, the built-in flash device 71 and the peripheral circuit controller 23 constitute an emission controller.

The photographing lens 51 is provided with a gear block 55 which is adapted to drive the focusing lens 53 in the optical axis direction, a lens joint 57 which is provided on the lens mount of the photographing lens 51 and is connected to the joint 47 of the camera body 11 to transmit the rotation of the AF motor 39 to the gear block 55, a lens CPU 61, and a distance switch 63.

The lens CPU 61 detects the position of the focusing lens 53 as a distance code, based on the state of the distance switch 63 to obtain distance data. The lens CPU 61 is connected to the peripheral circuit controller 23 of the camera body 11 through electric contact groups 59 and 49, so that the lens communication between the lens CPU 61 and the main CPU 35 can be carried out through the peripheral circuit controller 23 to input the lens data, such as distance data, focal distance data, or aperture value data.

Figure 2:
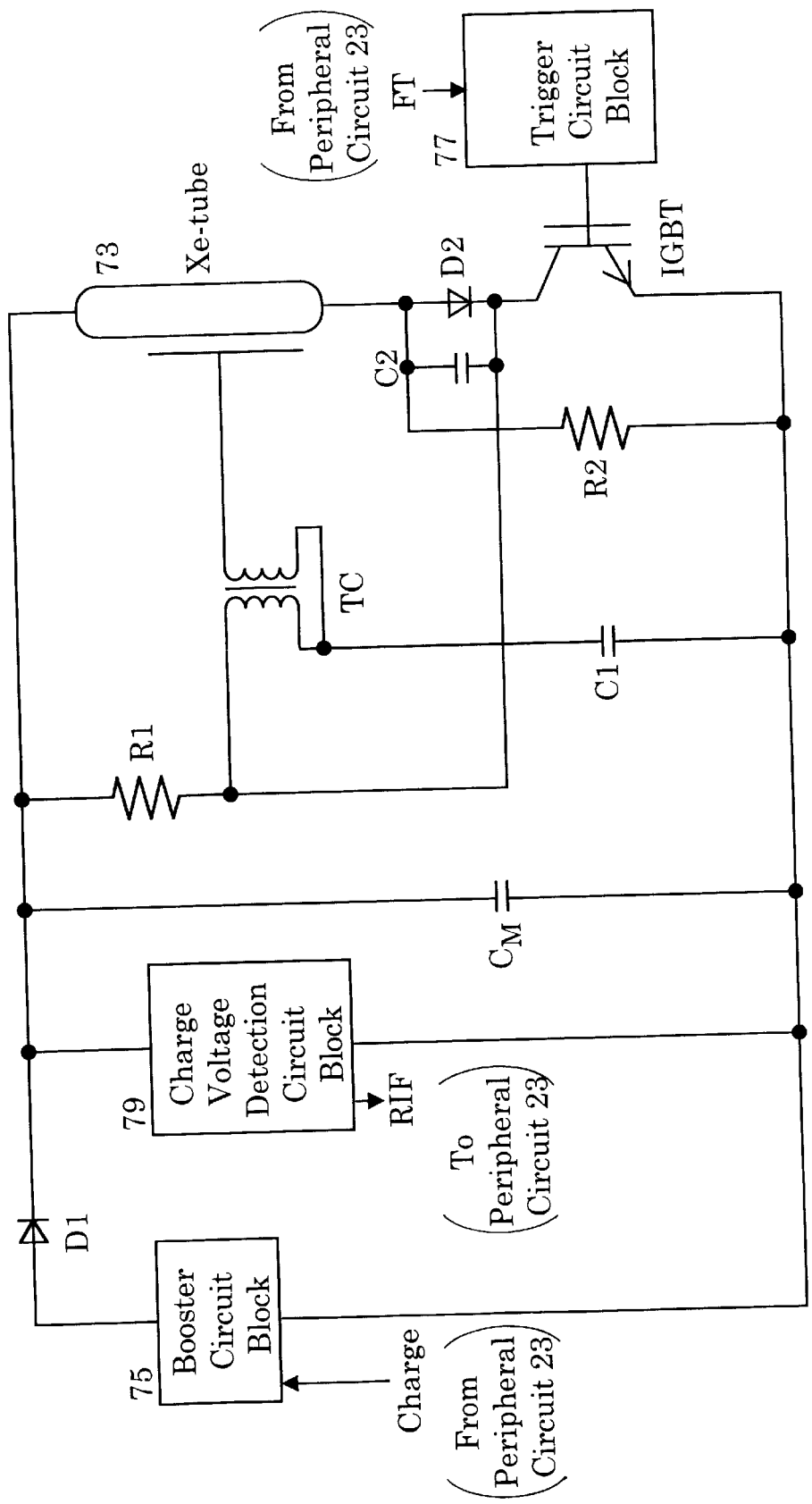
FIG. 2 is a circuit diagram of an emission control circuit of a flash device incorporated in a single lens reflex camera shown in FIG. 1.

The structure of the built-in flash device 71 and the emission control will be discussed below with reference to FIG. 2. The built-in flash device 71 includes a xenon tube 73, a booster circuit block 75 which is adapted to boost the battery voltage (not shown), a trigger circuit block 77 including a trigger control circuit which turns ON/OFF a trigger transistor IGBT (Insulator Gate Bipolar Transistor) to control the emission/stop of the flash, and a charge voltage detection circuit block 79 which detects the charge voltage of the main condenser $C_M$. The booster circuit block 75 and the trigger circuit block 77 are controlled in accordance with the charge signal input thereto through the peripheral circuit controller 23 by the main CPU 35 and the trigger signal input by the main CPU 35. The charge voltage control circuit block 79 inputs the charge voltage detection signal to the main CPU 35 through the peripheral circuit controller 23.

The built-in flash device 71 boosts the battery voltage using the booster circuit block 75 to charge the main condenser $C_M$, in response to the charge signal input from the main CPU 35. The charge voltage detection circuit block 79 detects the charge voltage of the main condenser $C_M$ and outputs the charge voltage detection signal to the main CPU 35. The trigger condenser C1 generates high voltage at a high-frequency, necessary to excite the xenon gas in the xenon tube 73 on the secondary side of the trigger transformer TC when the trigger transistor IGBT is turned ON. The voltage doubler condenser C2 applies the negative voltage to the negative pole side of the xenon tube 73 when the trigger transistor IGBT is turned ON. The voltages applied to the positive pole sides of the trigger condenser C1 and the voltage doubler condenser C2 prior to the emission are approximately identical to the charge voltage of the main condenser $C_M$.

When the trigger signal is supplied to the built-in flash device 71 from the main CPU 35, the trigger circuit block 77 turns the trigger transistor IGBT ON. At this moment, the charge voltages of the trigger condenser C1 and the voltage doubler condenser C2 are instantaneously reduced from a value approximate to the charge voltage of the main condenser $C_M$. Consequently, high voltage at a high frequency in order to excite the xenon gas within the xenon tube 73 is produced on the secondary side of the trigger transformer TC. Moreover, the potential on the positive pole side of the voltage doubler condenser C2 is zero due to the electric charges accumulated before emission, and hence the negative charge voltage of the voltage doubler condenser C2 appears on the negative pole side of the xenon tube 73. Consequently, the voltage which is approximately twice the charge voltage of the main condenser CM, i.e., high voltage at a high frequency is applied between the electrodes of the xenon tube 73 to excite the xenon gas to emit the flash light. If the trigger signal is stopped, the trigger circuit block 77 turns the trigger transistor IGBT OFF to stop the emission. It should be appreciated here that since the ON time of the trigger transistor IGBT during the intermittent emission is extremely short, a very small voltage drop of the main condenser $C_M$ occurs, and the charge voltage of the voltage doubler condenser C2 which has been reduced is increased to the charge voltage of the main condenser $C_M$ by charging before the subsequent emission takes place. Note that if the charge voltage of the voltage doubler condenser C2 is reduced below a predetermined value, the voltage to be applied between the electrodes of the xenon tube 73 upon receipt of the trigger signal is reduced, and hence the xenon tube tends not to emit light even if a high voltage is produced on the secondary side of the trigger transformer TC.

Figure 3:
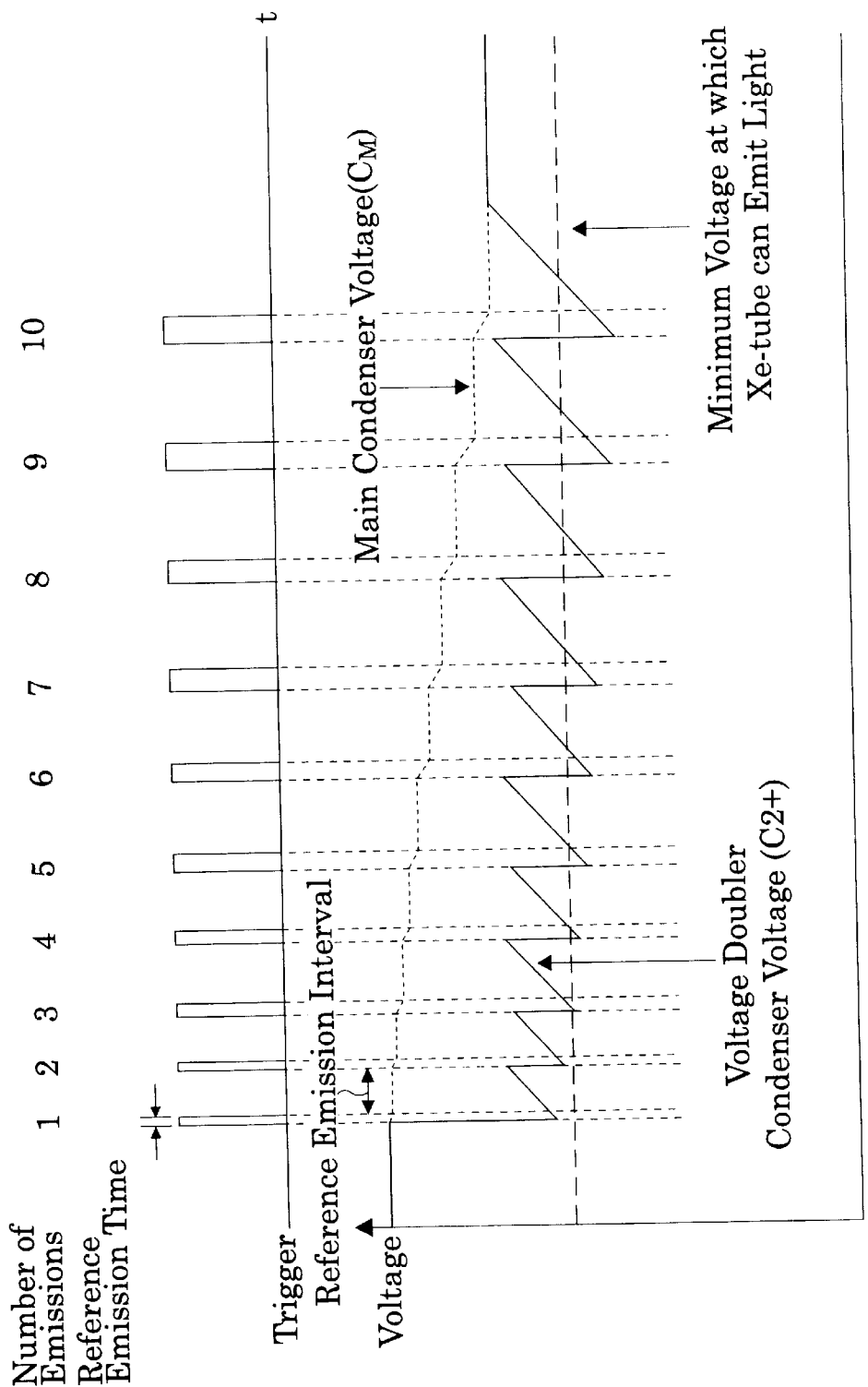
FIG. 3 is a timing chart of an intermittent emission control in a single lens reflex camera shown in FIG. 1.

FIG. 3 shows a timing chart of the intermittent emission control of the built-in flash device 71 according to an embodiment of the present invention.

The emission occurs within a controllable shortest emission time during an AF operation, and if the integration process of the AF sensor unit 21 is not completed, the emissions are intermittently repeated until the integration process is completed. The emission time is increased for every predetermined number of emissions in order to increase the quantity of light by one emission. Moreover, the interval between the emissions is increased corresponding to the increase in the emission time to prolong the charge time of the voltage doubler condenser C2. In the illustrated embodiment, two corrections are carried out, i.e., the emission time and the emission interval are increased at every two emissions. Namely, in the illustrated embodiment, the reference emission time is 10 $\mu$s (microseconds), the correction time is 2 $\mu$s, the reference emission interval is 10 ms (milliseconds), the correction interval is 2 ms, and the maximum number of the emissions is 10. The emission interval refers to a time between the stoppage of an emission and the commencement of a next emission. The number of times the emission time is corrected can be different from that of the emission interval. Namely, it is possible to independently correct the emission time and the emission interval. Note that the scale of the emission time in the timing chart shown in FIG. 3 is enlarged by approximately 1000 times.

The built-in flash device 71 emits a first flash of light for 10 $\mu$s in response to the trigger signal. The charged voltage of the voltage doubler condenser C2 is once reduced upon emission, but the voltage doubler condenser C2 is charged during the emission interval (10 ms) after the emission time lapses, so that the charge voltage necessary to carry out the emission can be recovered.

Upon a third emission, the emission time is increased by 2 $\mu$s to become 12 $\mu$s, and the emission interval is increased by 2 ms to become 12 ms. Upon a fifth emission, the emission time and the emission interval are increased to 14 $\mu$s and 14 ms, respectively. Note that the controllable shortest emission time and emission interval, and the second emission time and emission interval, and those subsequent thereto, are determined in accordance with the performance of the built-in flash device 71, etc.

When the first emission time is increased, the quantity of auxiliary light is increased, so that the voltage drop of the voltage doubler condenser C2 is increased. However, in the present invention, the emission interval is increased corresponding to the emission time so that, at the subsequent emission, the charge voltage of the voltage doubler condenser C2 increases to the value of the commencement of the previous emission. Therefore, the charge voltage of the voltage doubler condenser C2 at the commencement of the emission can be kept substantially constant and is not less than the minimum voltage necessary to emit the xenon tube 73. Namely, even if the number of emissions are increased, the certain amount of emission can be always ensured. Thus, it is not necessary to set the charge voltage of the built-in flash device 71 at the commencement of the first intermittent emission to a high voltage. Note that, in the illustrated embodiment, when the integral value of the monitor sensor 21a reaches a predetermined integration completion value, or when the integral value of the monitor sensor 21a does not reach the integration completion value after a predetermined maximum number of emissions is effected, no subsequent emission occurs and the integration process is stopped.

The main operation of a single lens reflex camera to which the present invention is applied will be discussed below, with reference to FIGS. 4 through 7.

Figure 4:
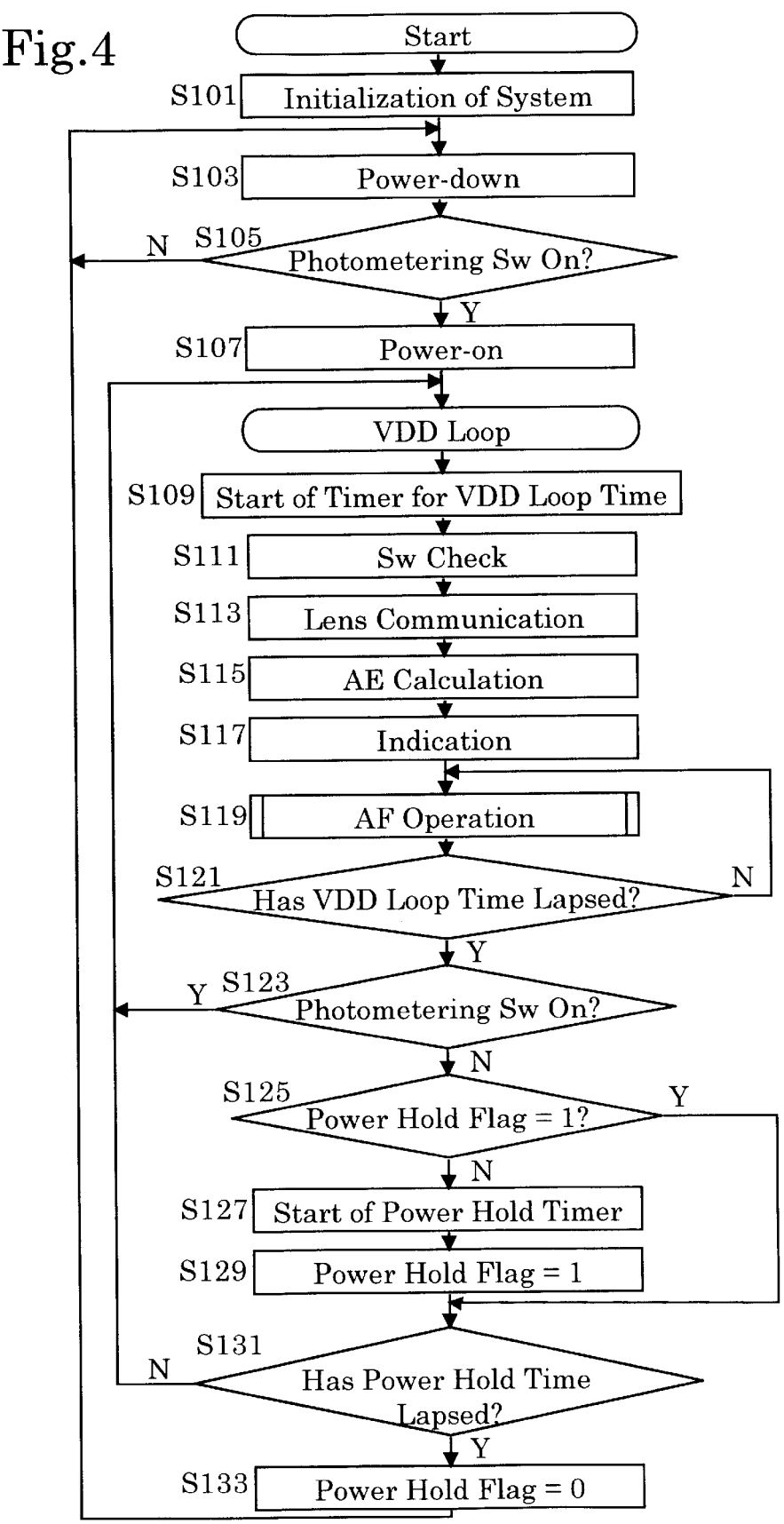
FIG. 4 is a flow chart of a main operation of a single lens reflex camera shown in FIG. 1.

FIG. 4 shows a flow chart of the main operation of the single lens reflex camera. In the main operation, when the photometering switch SWS is turned ON, the photometering operation and the exposure value calculation are carried out to obtain optimum aperture value and shutter speed. In addition, an AF calculation and a lens movement operation (AF operation) are carried out. Note that if the release switch SWR is turned ON, the exposure operation is carried out at the aperture value and the shutter speed obtained in the AF operation.

The control enters the main operation when a battery is loaded. In the main operation, the system port, etc., are initialized (S101). The power supply to the circuits or elements other than the main CPU 35 is interrupted (S103), and the control does not proceed until the photometering switch SWS is turned ON. If the photometering switch SWS is turned ON (S105; Y), the electric power is supplied to the peripheral circuits or devices to carry out the VDD loop operation (S107).

In the VDD loop operation, the VDD loop timer starts (S109), and state of the switches is checked (S111). Thereafter, lens communication is carried out between the main CPU 35 and the lens CPU 61 to input lens data, such as the open aperture value, the minimum aperture value, focal length data, etc., (S113).

An AE calculation is carried out (S115), and the photographing data such as the shutter speed, etc., obtained by the AE calculation is indicated (S117). The AE calculation refers to an operation to measure the brightness of an object to be taken by the photometering IC 18, and to obtain optimum shutter speed and aperture value at a predetermined exposure mode, e.g., a program exposure mode, in accordance with the object brightness data and the film sensitivity data, etc.

When the shutter speed and the aperture value are obtained, the focusing lens 53 is moved to focus on the object whose focused state has been detected through the AF sensor unit 21 to carry out an AF operation (S119). AF operations are repeated until the VDD loop time lapses (S121; N).

If the loop time has lapsed (S121; Y), the state of the photometering switch SWS is checked (S123). If the photometering switch SWS is ON, the control is returned to the VDD loop operation (S123; Y, S109). If the photometering switch SWS is OFF (S123; N), whether or not the power hold flag is set to 1 is checked (S125). If the power hold flag is not set to 1, the power hold timer starts (S125; N, S127). After the power hold flag is set to 1, the VDD loop operations are repeated until the set time of the power hold timer is up (S129, S131; N). If the power hold time has lapsed, the power hold flag is set to 0 and the control is returned to the power-down operation (S131; Y, S133, S103).

Figure 5:
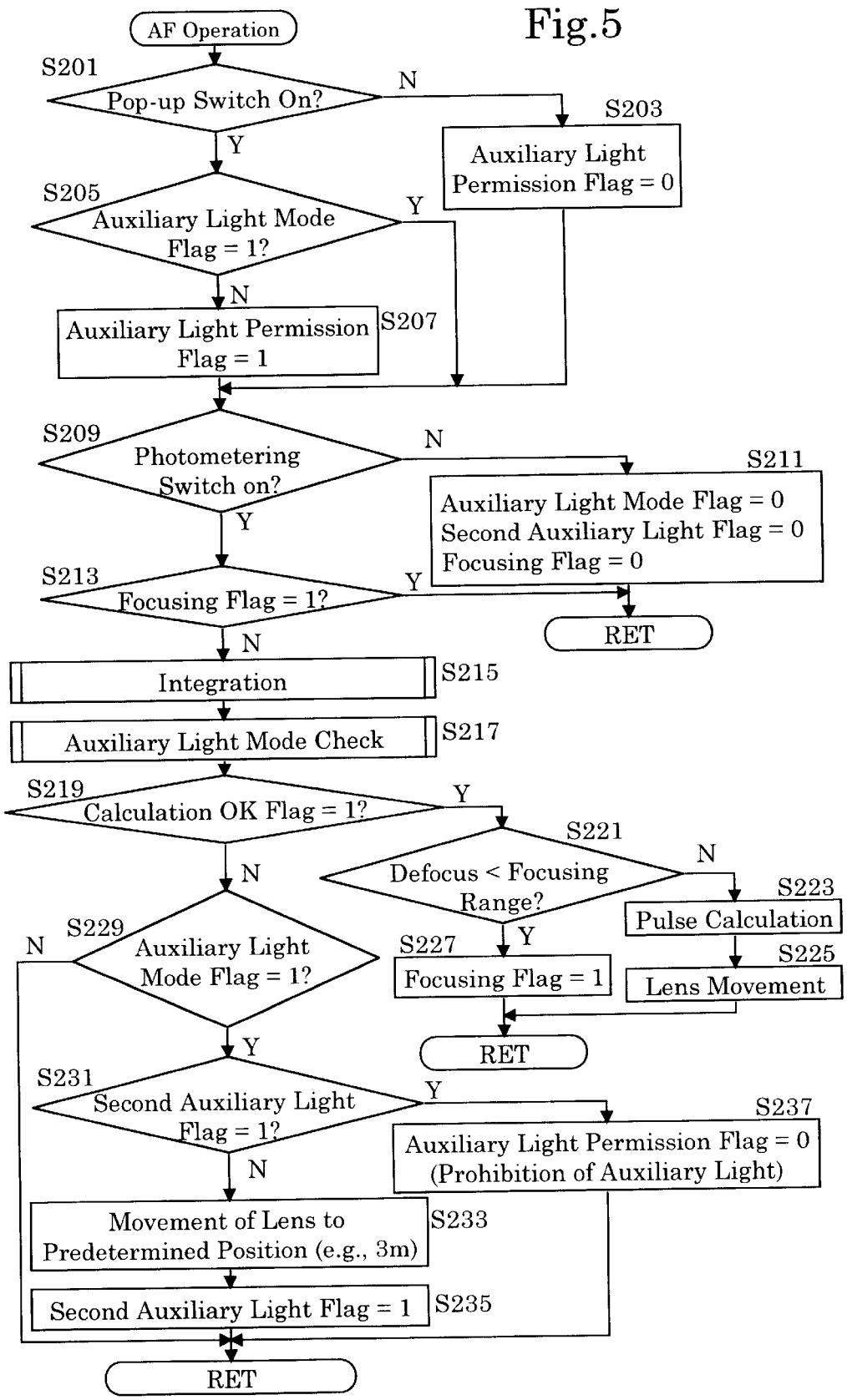
FIG. 5 is a flow chart of an AF operation in a single lens reflex camera shown in FIG. 1.

The AF operation which is carried out in the "AF operation" at S119 will be discussed below with reference to FIG. 5. In this AF operation, the focusing lens 53 is moved to focus on the object whose focused state has been detected in the focus detection operation. If it is impossible to detect a focused state by the regular focus detection operation, due to the low brightness or low contrast of the object, the focus detection is carried out again while emitting intermittent flashes of light by the built-in flash device 71, so that the focusing lens 53 can be moved to focus on the object whose focused state has been thus detected.

In the AF operation, whether or not the built-in flash device 71 is popped-up is checked by the pop-up detection switch SWP (S201). If the built-in flash device 71 is not popped-up, the auxiliary light permission flag is set to 0 (S201; N, S203), and the use of the auxiliary light is prohibited. The auxiliary light permission flag refers to a flag which permits the built-in flash device 71 to emit light as focus detecting auxiliary light if no focus detection can be carried out due to the low brightness or low contrast of the object, etc. If the built-in flash device 71 is popped-up, the auxiliary light mode flag is checked (S201; Y, S205). If the auxiliary light mode flag is not set to 1, the auxiliary light permission flag is set to 1 (S205; N, S207). The auxiliary light mode flag is set to 0 at the first AF operation and is subsequently set to 1 by the main CPU 35 in accordance with various conditions.

Thereafter, whether or not the photometering switch SWS is ON is checked (S209). If the photometering switch SWS is OFF, the auxiliary light mode flag, the second auxiliary light flag, and the focusing flag are set to 0 and the control is returned (S209; N, S211). If the photometering switch SWS is ON (S209; Y), the focusing flag is checked to check whether focusing is completed (S213). If focusing is complete, the control is returned (S213; Y). If the focusing is incomplete, an integration process begins (S213; N, S215). In the first integration process, the AF sensor unit 21 performs the integration process without actuating the built-in flash device 71 to emit light. Upon completion of the integration process of the AF sensor unit 21, the main CPU 35 receives the CCD video signal input thereto and converts the CCD video signal into the digital signal by the A/D converter 35e. The digital signal is stored in the RAM 35b and is subject to a defocus calculation to obtain the defocus amount. Consequently, the auxiliary light mode checking operation is carried out (S217). In the auxiliary light mode checking operation, the integration process is carried out again while intermittently emitting auxiliary light from the built-in flash device 71 if predetermined requirements are satisfied, i.e., for example, if no effective calculation result is obtained or the integration time is longer than a predetermined time.

Thereafter, whether or not an effective calculation result is obtained at step S215 or S217 is checked based on the calculation OK flag (S219). The calculation OK flag is a flag which is set to 1 when the defocus amount obtained after the completion of the defocus amount calculation is effective. If the calculation OK flag is set to 1 (S219; Y), a check is made to determine whether or not the calculated defocus amount is within the focus range in which the object is deemed to be in-focus. If the defocus amount is within the focus range, the focus flag is set to 1 and the control is returned (S221; Y, S227). If the defocus amount is out of the focus width (S221; N), which means that the object is out-of-focus, the number of the AF pulses is calculated based on the defocus amount (S223), so that the AF motor 39 is driven in accordance with the AF pulse number thus obtained to move the focusing lens 53, and thereafter, the control is returned (S225).

If the calculation OK flag is not set to 1, whether or not the auxiliary light mode flag is set to 1 is checked (S229). If the auxiliary light mode flag is not set to 1, the control is returned (S229; N). If the auxiliary light mode flag is set to 1 (S229; Y), a second auxiliary light flag check is carried out (S231). If the second auxiliary light flag is set to 0, (S231; N), the focusing lens 53 is moved to a predetermined position and the control is returned after the second auxiliary light flag is set to 1 (S235). For instance, the focusing lens 53 is moved to a position at which the object distance is 3 m. If the second auxiliary light flag is set to 1 (S231; Y), the auxiliary light permission flag is set to 0, i.e., the emission of the auxiliary light is prohibited and the control is returned (S237). Namely, at steps S229 through S237, if no focus detection can be carried out in the first AF operation using the auxiliary light, the focusing lens 53 is moved to a predetermined position in which the focus detection is carried out again while emitting the auxiliary light, and if a focus detection still cannot be carried out, further auxiliary light emission is prohibited.

Figure 6:
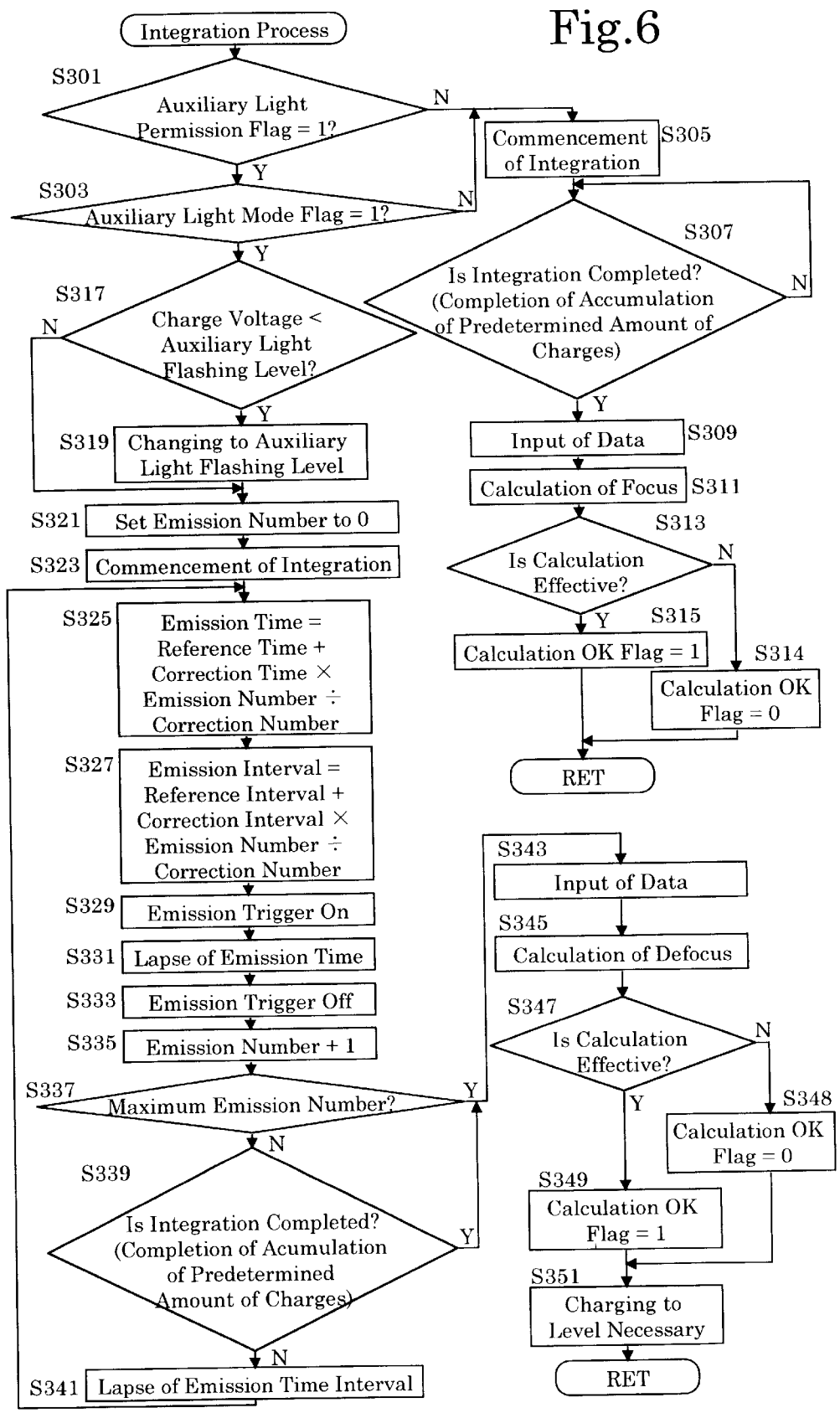
FIG. 6 is a flow chart of an integration process in a single lens reflex camera shown in FIG. 1.

The integration process carried out at step S215 will be discussed in detail below with reference to FIG. 6. In the integration process, the AF sensor unit 21 performs the integration process while emitting the auxiliary light when the requirements to emit the auxiliary light are met, for example, when the auxiliary light permission flag is set to 1; and the emission time or emission interval of the auxiliary light is controlled stepwise, so that not only a fine control of the quantity of auxiliary light to obtain an optimum quantity of light be carried out, but also the doubled voltage at the opposed ends of the xenon tube 73 necessary to emit the auxiliary light can be maintained constant.

In the integration process, the auxiliary light permission flag is checked (S301). If the auxiliary light permission flag is set to 1 (S301; Y), the auxiliary light mode flag is checked (S303). If the auxiliary light permission flag or the auxiliary light mode flag are not set to 1 (S301; N, S303; N), the integration process begins without emitting the auxiliary light (S305); upon completion of the integration, the CCD video signal is input (S307; Y, S309), the defocus amount calculation is carried out to obtain the defocus amount (S311), whether or not the calculation result is effective is checked (S313), if the calculation result is effective, the calculation OK flag is set to 1 (S313; Y, S315), and the control is returned. Whether the calculation result at step S313 (likewise at step S347) is effective or not is determined by judging whether or not the contrast of the object image is low. Specifically, for example, if the absolute value of the difference between output values of neighboring pixel elements read from the CCD does not reach a predetermined value, the main CPU 35 judges that the contrast of the object image is low, and the calculation is deemed not effective. If the calculation result is not effective, the calculation OK flag is set to 0 and the control is returned If the auxiliary light mode flag is set to 1 (S303; Y), the charge voltage of the built-in flash device 71 is checked (S317). If the charge voltage of the built-in flash device 71 does not reach a predetermined value necessary to emit the auxiliary light, the charge signal is issued to charge the built-in flash device 71 to the predetermined value (S317; Y, S319). Upon completion of the charging, the emission number counter of the built-in flash device 71 is set to 0 (S321), and the AF sensor unit 21 starts the integration process (S323). The emission time and the emission interval of the auxiliary light are calculated and set (S325, S327), and the trigger signal is sent to the built-in flash device 71 to emit the auxiliary light from the built-in flash device 71 (S329).

The quantity of light necessary to detect a focused state while intermittently emitting the auxiliary light varies depending on the object distance and is increased or decreased as the object distance increases or decreases. Therefore, the first emission takes place within a controllable shortest emission time and the emission time is increased for every predetermined number of emissions. Moreover, the emission interval is increased depending on the emission time. Thus, the quantity of auxiliary light can be controlled so that an appropriate quantity of light can be emitted, regardless of the conditions of the object to be taken. The emission time and the emission interval are defined by the following expressions and the timing chart thereof is shown in FIG. 3.

Emission time=reference emission time+correction time×emission number÷correction number Emission interval=reference emission interval+correction interval× emission number÷correction number The reference emission time and the reference emission interval refer to the first emission time and the first emission interval, respectively. The correction time and the correction interval refer to correction coefficients used to correct the emission time and the emission interval, respectively. The correction number refers to the number of emissions at which the emission time and the emission interval are modified. As the correction number is set to 2 in the illustrated embodiment, the emission time and the emission interval increase every second emission. These values are all preset values and are stored in the EEPROM 43 in the illustrated embodiment. The emission number increases one by one until the emission number becomes a predetermined maximum emission number or until the integration process is completed. However, the quotient, obtained by dividing the emission number by the correction number, is rounded down to an integer.

Alternatively, it is possible to obtain and store in advance the emission time and emission interval, corresponding to the number of emissions during the intermittent emission, in the EEPROM 43. In this alternative, it is disadvantageously necessary to increase the storage capacity of the EEPROM 43, etc. In the illustrated embodiment, since the emission time at each emission and the emission interval between the previous and subsequent emissions are determined based on the single reference emission time and the single reference emission interval, using the expressions mentioned above, it is necessary to store only five parameters in the memory (i.e., reference emission time, reference emission interval, correction time, correction interval, and correction number), thus resulting in a reduced storage capacity of the EEPROM 43, etc. Moreover, it is possible to easily apply the present invention to any type of camera or flash device by only appropriately modifying and setting the five parameters.

The main CPU 35 outputs the trigger signal to cause the built-in flash device 71 to begin the emission of the auxiliary light; after the lapse of the set emission time (S331), the trigger signal is stopped to stop the emission of the built-in flash device 71 (S333); and the number of emission is incremented by one (S335). Whether or not the number of the emissions of the auxiliary light reaches the predetermined maximum value is checked (S337). In the illustrated embodiment, the maximum emission number is 10 but is not limited thereto. If the emission number does not reach the preset maximum value (S337; N), whether or not the integration process of the AF sensor unit 21 is completed is checked (S339). If the integration process is not completed (S339; N), the emission is repeated after the lapse of the emission interval (S341). While the control waits for the lapse of the emission interval at step S341, the charge voltage of the voltage doubler condenser C2 recovers. If the emission number reaches the preset maximum number or if the integration process of the AF sensor unit 21 is completed (S339; Y), the CCD video signal is input (S343) to carry out a defocus calculation to thereby obtain a defocus amount (S345). If the calculation result is effective, the calculation OK flag is set to 1 (S347; Y, S349); and if the calculation result is not effective, the calculation OK flag is set to 0 (S347; N, S348), and the built-in flash device 71 is charged to the voltage level necessary to emit the auxiliary light and the control is returned (S351).

Figure 7:
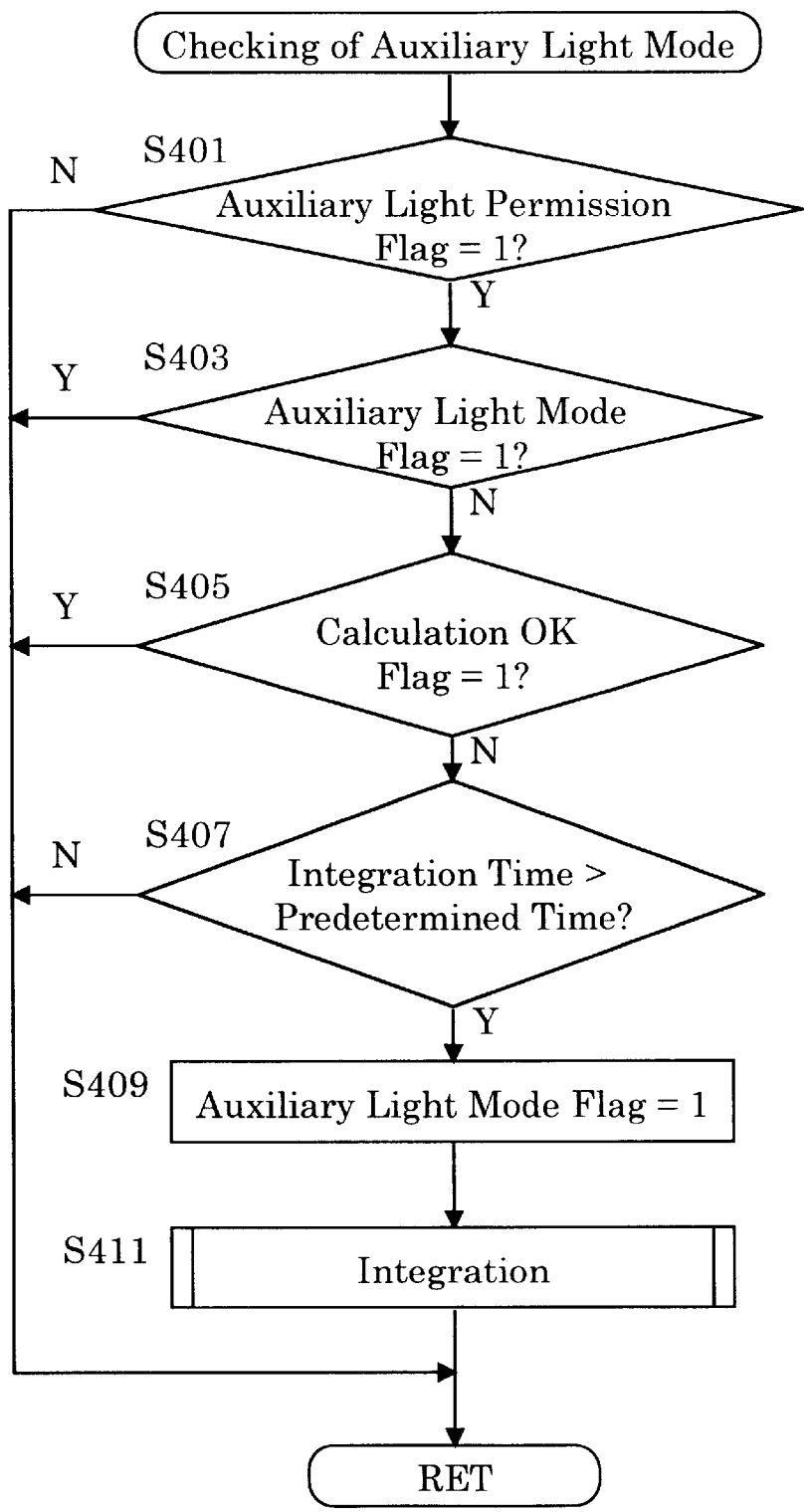
FIG. 7 is a flow chart of an auxiliary light mode checking operation in a single lens reflex camera shown in FIG. 1.

The auxiliary light mode check which is carried out at the "auxiliary light mode check" operation at step S217 will be discussed below with reference to FIG. 7. In the auxiliary light mode checking operation, focus detection is carried out while intermittently emitting the flashes of light as auxiliary light in the case that it has been impossible to detect a focused state without emitting the auxiliary light.

In this operation, the state of the auxiliary light permission flag is checked (S401). If the auxiliary light permission flag is set to 1 (S401; Y), the state of the auxiliary light mode flag is checked (S403). If the auxiliary light mode flag is not set to 1 (S403; N), the calculation OK flag is checked (S405). If the calculation OK flag is not set to 1 (S405; N), the integration time is compared with a predetermined value (S407). The integration time refers to a time from the commencement of the integration process to the completion thereof. If the integration time exceeds the predetermined time (S407; Y), i.e., if the object is dark, the auxiliary light mode flag is set to 1 (S409), the built-in flash device 71 intermittently emits the flashes of light, the integration process is carried out again, and the control is returned (S411). Note that the integration process at step S411 is the same process as step S215 shown in FIG. 6.

The auxiliary light permission flag which has been set to 0 at the commencement of the AF operation is set to 1 at step S207 upon the first AF operation, under the condition that the built-in flash device 71 is popped-up. Also, the auxiliary light permission flag is set to 0 at step S237 if the focus cannot be detected even by the focus detection operation using the intermittent emissions of auxiliary light after movement of the focusing lens 53 to a predetermined position. Moreover, the auxiliary light mode flag is set to 1 at step S409 if the result of the focus detection carried out without emitting the flash of light is not effective due to the dark object. Namely, in the auxiliary light mode checking operation, the integration process is carried out while the first one emission of the auxiliary light by the built-in flash device 71 occurs (S411); for the subsequent operations, the intermittent emissions of the flashes of light are carried out in the integration process at step S215 since the auxiliary light mode flag has been set to 1; and thereafter, no integration process is carried out in the auxiliary light mode checking operation. Furthermore, if the emission of the auxiliary light is prohibited after the auxiliary light permission flag is set to 0 at step S237, the auxiliary light permission flag is not set to 1 at step S207 so long as the auxiliary light mode flag is set to 0 at step S211 after the photometering switch SWS is turned OFF.

Although the first emission time when the auxiliary light is intermittently emitted, i.e., the reference emission time is a fixed value corresponding to the controllable shortest time in the illustrated embodiment, the present invention is not limited thereto and the reference emission time can be a variable value. For instance, it is possible to increase the reference emission time as the open F-number of the photographing lens becomes large or as the shortest object distance of the photographing lens is increased. In addition, although both the emission time and the emission interval are varied in the illustrated embodiment, it is alternatively possible to vary only the emission interval without varying the emission time. In this alternative, the voltage doubler condenser C2 can be sufficiently charged upon the intermittent emissions of the auxiliary light, and hence emission can be reliably carried out even if the number of the emissions is increased.

As can be understood from the foregoing, according to the present invention, if the focus detection cannot be carried out due to the low brightness of the object, the light emitter intermittently emits auxiliary light for the focus detection, so that a focused state can be detected under the intermittent emissions of the auxiliary light. The emission time and/or the emission interval are varied stepwise at every predetermined number of emissions. Consequently, the quantity of the auxiliary light can be precisely controlled regardless of the conditions of the object and a reliable emission can always be ensured, even if the number of emission is increased.

Moreover, if the first emission time and/or emission interval of the auxiliary light is set to be the controllable shortest time, no excess emission takes place for a close object, and hence the integration time of the focus detector can be reduced. Furthermore, if the emission time and/or emission interval is varied stepwise, the integration time of the focus detector for a distant object can be reduced in comparison with the emission for a constant emission time and at a constant emission interval.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An automatic focusing apparatus comprising:
   a focus detector that receives object light and detects a focused state of an object;
   a light emitter that emits a flash of light toward the object; and
   an emission controller that causes said light emitter to intermittently emit flashes of light as an auxiliary light source for detecting the focused state when focus detection cannot be carried out by said focus detector;
   wherein said emission controller varies in a stepwise manner, both an emission time and an emission time interval at every predetermined number of emissions, when the light emitter intermittently emits flashes of lights as the auxiliary light source.

2. The automatic focusing apparatus according to claim 1, wherein said emission controller increases at least one of the emission time and the emission time interval, as the number of emissions increases.

3. The automatic focusing apparatus according to claim 2, wherein said at least one of the emission time and the emission time interval at the commencement of the emission is the controllable shortest time.

4. The automatic focusing apparatus according to claim 1, wherein said emission controller causes the light emitter to intermittently emit flashes of light when the focus detector cannot detect the focused state without emitting auxiliary light.

5. The automatic focusing apparatus according to claim 4, in combination with a camera having a controller which moves a focusing lens of a photographing lens in accordance with the detection result of the focus detector, wherein when the focus detector cannot detect the focused state while intermittently emitting flashes of light by the light emitter, said controller moves the focusing lens to a predetermined position and then controls the emission controller so that the focus detector detects the focused state while the emission controller causes the light emitter to intermittently emit flashes of light.

6. The automatic focusing apparatus according to claim 5, wherein the emission controller sets a preset maximum number of the emissions.

7. The automatic focusing apparatus according to claim 6, wherein said focus detector comprises an image pickup device which receives object light, converts the object light into electric signals, and integrates the electric signals as electric charges; and
wherein upon intermittent emission of the light emitter, said emission controller stops the intermittent emission of the light emitter when the integral value of the image pickup device reaches a predetermined value before the number of the emissions reaches the preset maximum number.

8. The automatic focusing apparatus according to claim 2, wherein said emission controller varies one of the emission time and the emission time interval so that the one of the emission time and the emission time interval is increased from the controllable shortest time.

9. The automatic focusing apparatus according to claim 1, wherein the emission time and the emission time interval is defined by a predetermined calculation based on a predetermined reference emission time, a predetermined reference emission time interval, and the number of emissions from the previous emission of said light emitter.

10. The automatic focusing apparatus according to claim 9, wherein the emission time and the emission time interval is defined by the following expressions (1) and (2):

$$\text{Emission time} = \text{reference emission time} + \text{correction time} \times \text{the emission number} \div \text{correction number}; \quad (1)$$

and $$\text{Emission time interval} = \text{reference emission interval} \times \text{the emission number} \div \text{correction number}; \quad (2)$$

wherein said correction time, said correction interval and said correction number are predetermined values.

11. An automatic focusing apparatus comprising:
a focus detector that receives object light and detects a focused state of an object;
a light emitter that emits light toward the object; and
an emission controller that causes said light emitter to intermittently emit flashes of light as an auxiliary light source for detecting the focused state when focus detection cannot be carried out by said focus detector;
wherein said emission controller is capable of varying both an emission time and an emission time interval when the light emitter intermittently emits flashes of lights as the auxiliary light source.

* * * * *